United States Patent

Goldberg et al.

[15] 3,651,333
[45] Mar. 21, 1972

[54] CONTROLLER BY-PASS TRANSFER STATION FOR AN ELECTRON PROCESS CONTROL SERVOSYSTEM

[72] Inventors: Jack Goldberg; Louis H. Fricke, Jr., both of St. Louis, Mo.

[73] Assignee: Monsanto Company, St. Louis, Mo.

[22] Filed: Apr. 2, 1970

[21] Appl. No.: 24,988

[52] U.S. Cl. .......................................... 307/130, 323/22 T
[51] Int. Cl. ........................................................ G05f 1/56
[58] Field of Search ............... 307/130, 131, 133, 136, 87; 323/22 T

[56] References Cited

UNITED STATES PATENTS

| | | | |
|---|---|---|---|
| 3,511,966 | 5/1970 | Bone | 323/22 T |
| 3,201,650 | 8/1965 | Schultz | 307/130 |
| 3,502,896 | 3/1970 | Langkamp | 323/22 T |
| 3,353,092 | 11/1967 | Rubin | 307/130 |
| 3,536,989 | 10/1970 | Muchnick | 323/22 T |
| 3,538,418 | 11/1970 | Allington | 323/22 T |
| 3,530,368 | 9/1970 | Gerard | 323/22 T |

Primary Examiner—Robert K. Schaefer
Assistant Examiner—William J. Smith
Attorney—J. D. Upham, H. R. Patton and W. J. Bethurum

[57] ABSTRACT

The controller bypass transfer station disclosed herein is operative to be connected electrically in parallel with a main automatic process controller of a process control system. The transfer station includes a differential amplifier and its associated voltage balance control circuitry, and a DC control potential from this voltage balance control circuitry is adjusted so that the difference of potential between the transfer station circuit output node and a voltage supply terminal is made equal to the difference of potential developed across a final control element of the process control system. The transfer station current, which is proportional to this voltage, can therefore be made equal to the same current flowing simultaneously through the final control element and the automatic process controller. Thus, when the transfer station is connected to provide an alternate current path for the final control element, and the automatic process controller is electrically disconnected from the final control element, there is no undesirable interruption in the current flowing in the final control element and a "bumpless" transfer is achieved. The transfer station described herein also includes means for sourcing current to or sinking current from a process control system to also achieve a bumpless transfer when the main controller is reinserted in the system.

12 Claims, 4 Drawing Figures

INVENTORS
JACK GOLDBERG
LOUIS H. FRICKE, JR.
BY *William J Bethurum*
ATTORNEY

INVENTORS
JACK GOLDBERG
LOUIS H. FRICKE, JR.
BY William J Bethurum
ATTORNEY

CONTROLLER BY-PASS TRANSFER STATION FOR AN ELECTRON PROCESS CONTROL SERVOSYSTEM

FIELD OF THE INVENTION

This invention relates generally to electronic process controllers and the closed loop servosystems in which they are used. More particularly, this invention is directed to a controller bypass transfer station for allowing a main process automatic controller to be removed from a process control loop while providing uninterrupted process control within the loop during such removal and during the subsequent reinsertion of the controller into the loop.

BACKGROUND OF THE INVENTION AND DISCUSSION OF PRIOR ART

As is known in the process control art, the so-called process controller is designed to operate in a closed servo-type process control loop which includes the process to be controlled and number of energy transforming devices. This closed loop system will be referred to herein as the process control loop or system. FIG. 1, which will be described hereinafter, is such a process control loop which is well known in the art.

The process sensor of the above process control system measures the parameter of the process to be regulated by the control loop, and this parameter is converted to a standard range current signal by a transmitter. This standard range current signal provides the process variable input signal to an automatic controller within the process control loop. The function of the automatic controller in the process control loop is to compare the derived and transmitted process variable electrical signal with a desired value for the process variable (sometimes referred to as the set point and corresponding to some reference voltage) and generate an error signal in response to such comparison. This error signal is in turn used to actuate a final control element operator, such as a current-pressure transducer, which drives a final control element such as a valve, within the closed loop process control system. The final control element moves the process variable to or toward the set point and minimizes the error signal or reduces the error signal to zero.

For a number of various reasons, such as maintenance, reconstruction or repair, it is frequently desired to remove the automatic controller from the process control loop without altering the value of current which is flowing in the final control element at the time the automatic controller is to be removed. One prior art practice for maintaining a desired level of current in the final control element while disconnecting an automatic controller therefrom utilized a current balancing technique for establishing a constant current in a path that paralleled or bypassed the main automatic controller. In accordance with this prior art practice, a break in electrical connection was made between the final control element and the main controller, and a selected impedance was inserted therebetween in order to balance the current flowing through this impedance with the current flowing through another impedance which formed part of a null balancing bridge. A separate constant current source was commonly used to provide a substantially constant current through this alternate impedance. After the bias on this separate constant current source was adjusted by conventional biasing techniques so that the current flowing in the alternate impedance was equal to the current flowing in the impedance previously inserted between the controller and the final control element, then the final control element current was switched over to the constant current source. With this current source now conducting current from the final control element rather than the automatic controller, the latter could be removed from the closed loop process control system.

The above described prior art technique for maintaining a given current level in the final control element while removing the automatic controller from the process control system had several disadvantages. One of these disadvantages was the added system requirement for the null balancing bridge, including the two above identified impedances and their associated current switches. Secondly, and probably the greatest disadvantage of the above-described prior art technique, was the necessity to break electrical contact between the final control element and the automatic controller. This break in electrical contact was normally made when one of the null bridge impedances was electrically connected between the main automatic controller and the final control element prior to balancing the bridge. This insertion of a fixed impedance between the final control element and the automatic controller would frequently cause an undesirable current variation in the final control element and thus produce an extraneous valve movement within final control element. This action is sometimes referred to in the process control art as "bumping" the process control system.

OBJECTS OF THE INVENTION

An object of the present invention is to provide a new and improved process control system possessing none of the aforedescribed disadvantages and wherein the main automatic process controller used to establish the set point control in the system can be readily removed from said system and subsequently reinserted therein without detrimentally interrupting the process being controlled.

Another object of this invention is to provide a novel transfer station for a closed loop process control system. This transfer station functions as an automatic controller bypass circuit operative to provide an alternate current path for the final control element of the system during the removal of the main automatic process controller therefrom. The operation of this transfer station during the insertion and removal of the automatic controller into and from process control systems prevents extraneous or false control signals from occuring in the system and "bumping" the system.

A further object of the present invention is to provide a novel transfer station of the type described utilizing solid-state electronics, including a novel electronic circuit combination of low power integrated circuit operational amplifiers or the like and discrete power components such as silicon power transistors. These above solid state electronic components are combined in a relatively low cost and highly reliable novel electronic circuit (or subsystem) to be more fully and completely described hereinafter.

FEATURES OF THE INVENTION

A feature of the present invention is the provision of a differential amplifier connected between a voltage supply terminal (common to both the transfer station and the final control element) and a circuit output node for establishing a voltage at the circuit output node equal to the voltage developed across the final control element of the process control system. Both of these voltages are thus referenced to a single supply voltage.

Another feature of this invention is the provision of a voltage balance control network connected between the voltage supply terminal and one input of the differential amplifier for controlling the output voltage of the transfer station and enabling same to be adjusted to a desired voltage.

A further feature of this invention is the provision of a complementary type current amplifier coupled between the output of the differential amplifier and the circuit output node of the transfer station. The complementary current amplifier is operative to either source current to or sink current from the process control system when a main process controller is reinserted in the system.

SUMMARY OF THE INVENTION

Briefly, this invention is directed to an electronic controller bypass transfer station for a closed-loop process control system. Such transfer station is responsive to the voltage developed across the final control element of the closed loop system to provide a current bypass or alternate current path for the final control element during the removal of the automatic controller from the closed loop system. Since the transfer station current is proportional to the voltage developed across the final control element of the system, then the transfer station current can be advantageously adjusted equal to the current flowing in the final control element. These currents will remain equal regardless of the voltage variations across the final control element, and the removal of the main automatic controller from the system during the operation of the transfer station does not cause any alteration or interruption of current flowing therein.

In a novel circuit embodiment of the invention, differential amplifier means are connected to the final control element of the process control system and respond to voltage variations across the final control element to provide a current output signal which varies according to the current variations in the final control element. A complementary type output current amplifier is connected between the output of the differential amplifier means and a transfer station circuit output node, and this output current amplifier either provides a required drive current to the final control element or conducts bypass current therefrom during the insertion of an automatic controller into the process control loop or system. These functions provided by the output current amplifier are sometimes referred to in the electronics art as current "sourcing" and current "sinking."

DESCRIPTION OF THE PREFERRED EMBODIMENT

Figure 1:
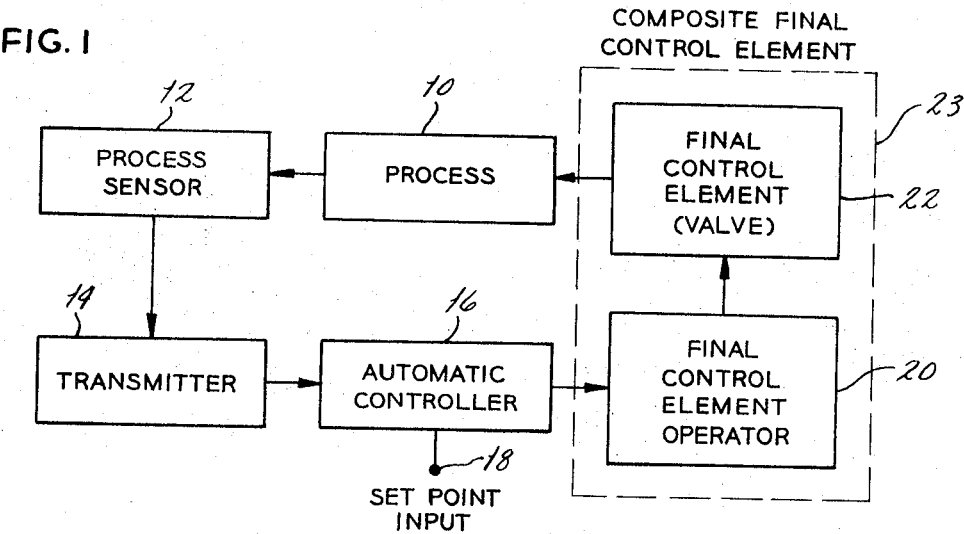
FIG. 1 illustrates a simplified process control loop of the type in which the present invention operates.

Referring to the drawings, there is shown in FIG. 1 a simplified closed-loop process control system which will be alternatively referred to herein as the "process control loop." This process control loop includes the process 10 which is controlled and a process sensor 12 which converts certain process variations to an electrical signal. The sensor 12 could be, for example, a pressure-to-current (P/I) transducer. The electrical output signal of sensor 12 is coupled to a transmitter 14 which in turn drives the main automatic controller 16 of the process control loop. The electrical signal transmitted by the transmitter 14 is compared in the automatic controller 16 to a reference voltage, the value of which is sometimes referred to as a set point. The set point or reference voltage terminal is indicated by numeral 18 in FIG. 1. The automatic, controller 16 generates an error signal which is used to control the final control element 23 of the process control loop. The composite final control element 23 includes a final control element operator 20, such as a current-to-pressure (I/P) transducer, which drives a final control element 22, such as a valve, or the like. The operator 20 conducts an error current which, through well-known electrical-to-mechanical transducer action, produces corrective motion of the final control element 22 to in turn correct an undesirable variation in the process 10. For example, the flow rate or velocity of the process 10 could be corrected by a repositioning of a control valve which is the final control element 22. In this example, the operator 20 would normally be an I/P transducer.

Figure 2:
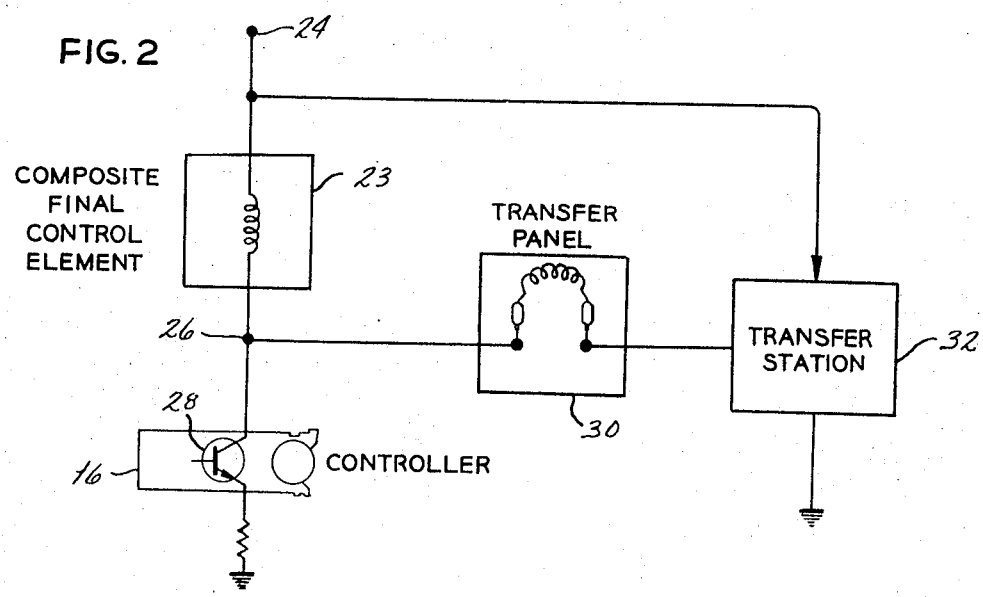
FIG. 2 is a circuit diagram, partially functional and partially schematic, which illustrates the specific connection of the novel transfer station according to this invention to the composite final control element of the control loop shown in FIG. 1.

FIG. 2 also shows the controller 16 and its direct connection to the composite final control element 23. The final control element 23 includes both the final control element operator 20 and the final control element 22 as shown in FIG. 1. The final control element 23 is illustrated schematically in FIG. 2 as an inductor or coil because of the inductance commonly associated with the electrical-to-mechanical transducer which comprises the operator 20 of the composite final control element 23. The composite final control element 23 is connected directly to a power supply terminal 24, and a single power supply (not shown) is used to power both the transfer station 32 to be described and the composite final control element 23. The transfer station 32 is connected through a conventional transfer panel 30 to a load terminal 26 of the composite final control element 23, and this terminal 26 is directly connected to the output device 28 of the automatic controller 16. In the preferred embodiment of the invention, the output device 28 is an NPN-transistor.

Figure 3:
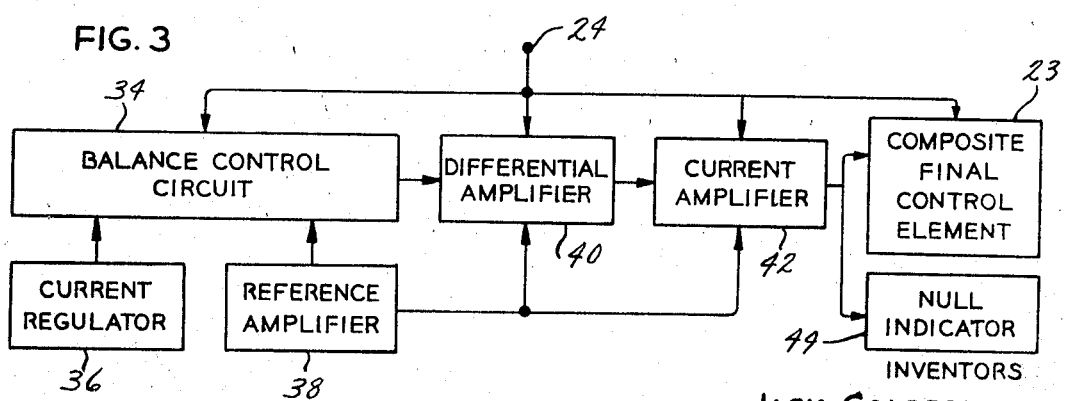
FIG. 3 is a functional block diagram of the transfer station and composite final control element shown in FIG. 2.

FIG. 3 is a functional block diagram of the controller bypass transfer station according to he present invention and includes a differential amplifier 40 connected to the voltage supply terminal 24. A current amplifier 42 is connected directly in cascade to the output of the differential amplifier 40 and provides a desired level of output current for the transfer station 32, and voltage balance control circuitry 34 is connected between the input of the differential amplifier 40 and the voltage supply terminal 24. Reference voltage diodes and voltage dividers in the balance control circuitry 34 provide the required DC operating potentials for the differential amplifier 40.

A current regulator 36 provides a substantially constant reference current for the proper operation of the balance control circuit 34, and a reference buffer amplifier 38 interconnects the balance control circuit 34 with the differential amplifier 40. The buffer amplifier 38 provides the required fine control input signal for the differential amplifier 40 and also provides a desired amount of electrical isolation between the differential amplifier 40 and the balance control circuit 34.

A null indicator 44, which may be selected from certain types of commercially available voltmeters, is connected between the output of the current amplifier 42 and a load terminal 26, and by making the proper adjustment in the balance control circuit 34, the voltage at the transfer station circuit output node 174 can be adjusted equal to the voltage drop across the final control element 23, with both voltages being referenced to the voltage at the common power supply terminal 24.

Figure 4:
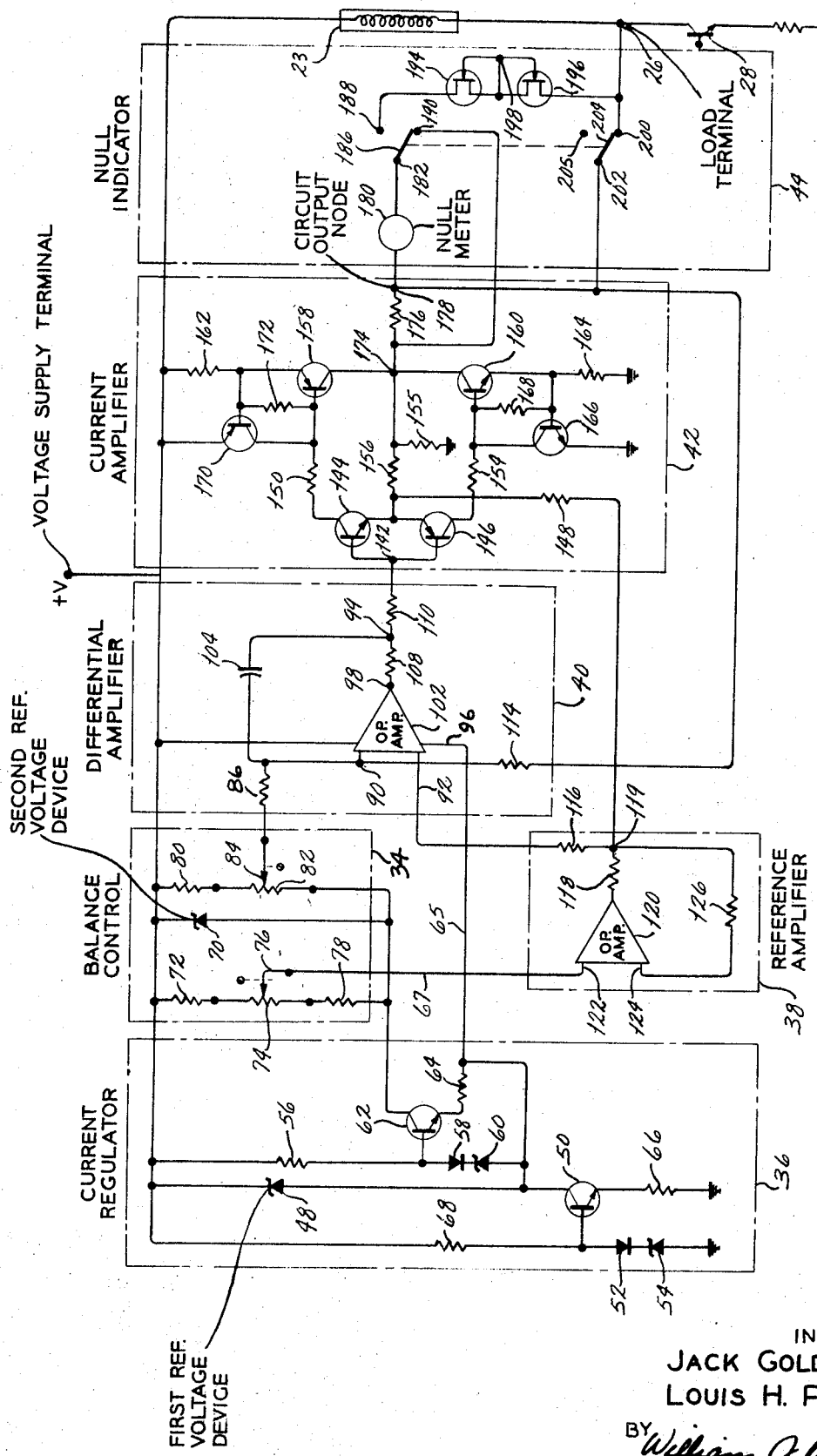
FIG. 4 is a detailed schematic diagram illustrating the transfer station shown in FIGS. 2 and 3. Identical reference numerals have been used in FIGS. 2, 3 and 4 to indicate corresponding and identical circuit portions of these three figures.

Referring now to FIG. 4, the current regulator 36 for the transfer station 32 is shown in some detail and includes a first reference voltage device 48, such as a Zener diode, which is serially connected to an NPN-current sink transistor 50. This transistor 50 sets or establishes the reference current for the entire transfer station 32. A base bias resistor 68 and serially connected diodes 52 and 54 together establish the base bias for the NPN-current sink transistor 50, and the forward diode 52 provides temperature compensation for both the NPN-transistor 50 and the Zener diode 54. The breakdown voltage of the Zener diode 54 is primarily responsible for establishing the DC reference potential at the base of NPN-transistor 50. A current limiting emitter resistor 66 interconnects the transistor 50 and ground or reference potential.

In an embodiment of the invention which has been built and successfully operated, the supply voltage at terminal 24 was +45 volts and the Zener diode 48 was a 30-volt rated Zener diode; so that the voltage at the collector node of current sink transistor 50 was approximately +15 volts with respect to ground potential. This +15 volt potential was applied via conductor 65 to one input terminal 96 of the differential amplifier 102 to be described in more detail herein.

The current regulator 36 also includes another NPN-transistor 62 which is interconnected via resistor 64 to the collector of NPN-transistor 50. The NPN-transistor 62 serves as a constant current sink for the balance control circuitry 34, and resistor 56 and diodes 58 and 60 set the base bias potential of NPN-transistor 62, just as the resistor 68 and diodes 52 and 54 set the base bias potential for the NPN-transistor 50.

The balance control circuitry 34 includes a second reference voltage device 70 in the form of a Zener diode which is interconnected between the +45 volt supply terminal 24 and the collector node of the NPN-transistor 62. In the embodiment of the invention which has been built, and successfully operated, the breakdown voltage of Zener diode 70 was +20 volts, thereby establishing a +25 volt potential at the collector node of the NPN-transistor 62. The balance control circuitry 34 further includes a first voltage divider network comprising resistors 80 and 82 with an intermediate tap 84 on resistor 82 for coarse balance control of differential amplifier 40. The coarse balance control potential at intermediate tap 84 is interconnected via conductor 69 and resistor 86 to one input terminal 90 of the operational amplifier 102. A second voltage divider in the balance control circuitry 34 includes resistors 72, 74 and 78. An intermediate tap 76 on resistor 74 is adjustable for fine balance control of the differential amplifier 40, and a fine balance control potential derived at intermediate tap 76 is coupled through conductor 67 to the reference amplifier 38 to be described. This fine balance control potential is coupled through the unity gain buffer amplifier 38 to another input terminal 92 of the differential operational amplifier 102. Thus, the differential amplifier stage 40 is connected at one terminal or pin 94 to the +45 volt supply voltage at terminal 24, to the +15 volt reference potential on conductor 65, and to the coarse and fine balance control potentials which are applied to operational amplifier 102 inputs 90 and 92.

The differential amplifier stage 40 may be designed using one of many commercially available types of operational amplifiers 102 which have inverting and noninverting inputs 90 and 92. In the transfer station 32 actually built and operated, the operational amplifier 102 was a MC1437L type of operational amplifier which is a so-called dual type of operational amplifier including two operational amplifiers in a single package. Therefore, one-half of the MC1437L package was used as the operational amplifier 102, and the other half of the MC1437L package was used as the isolation or buffer amplifier 120. The operational amplifiers 102 and 120, while not limited in their construction to integrated circuits, may advantageously be selected from many commercially available types of integrated circuit operational amplifiers. A typical integrated circuit operational amplifier (not shown) includes a differential input stage that provides most of the operational amplifier circuit gain, and this first stage usually employs a current source at the common emitter node of the first stage for good common mode rejection. The second stage of the operational amplifier is usually another differential amplifier stage without a current source, and the third stage is usually a DC level translating or shifting network, sometimes referred to as a "bias string" of resistors and diodes. This third stage establishes the proper DC level for the amplified signal. The output stage of the typical operational amplifier is DC coupled to the level translating third stage, and is biased to provide a desired output voltage swing and designed to have a desired output current drive capability. Frequently, one or more external frequency compensating capacitors are connected between stages of the operational amplifier or between transistors in a single stage in order to improve the gain-versus-frequency characteristic of the operational amplifier.

The reference amplifier 38 has one input conductor 122 which is connected via line 67 to the fine balance control potentiometer tap 76 in the balance control network 34. Output resistors 118 and 116 are connected between the output 130 of the operational amplifier 120 to the input conductor 92 of the previously described operational amplifier 102, and a feedback resistor 126 interconnects the common junction or node 119 between resistors 116 and 118 to input conductor 124 of the operational amplifier 120. The reference amplifier 38 is a unity gain amplifier and provides a desired amount of electrical isolation between the fine balance control circuit 34 and amplifier 102 and prevents loading of the second voltage divider network of resistors 70, 74, and 78 by the operational amplifier 102.

The current amplifier stage 42 is connected to the output resistor 110 in the differential amplifier stage 40 and provides the required current gain necessary for the transfer station 32. The current amplifier 42 includes complementary input transistors 144 and 146 which are connected to a common input node 142, and further includes complementary first and second output transistors 158 and 160 connected as shown to a common current output node 174. The complementary input transistors 144 and 146 and the complementary output transistors 158 and 160 alternately conduct to either provide an output current drive to (transistor 158 collector current) or to sink current from (transistor 160 collector current) the composite final control element 23. Transistors 166 and 170 together with their base bias resistors 168 and 172 provide the well-known current limiting action in the current amplifier 42 by reducing the base current drive at the first and second output transistors 158 and 160 when the collector and emitter currents in these two transistors reach a certain level. Thus, when the emitter current of the second output or current bypass transistor 160 rises to a certain level, and increases the base potential of transistor 166 to a given level, transistor 166 turns on, robbing transistor 160 of base current drive and thereby limits the output current conduction thereof of the second output transistor 160.

The common node 174 between the first and second complementary output transistors 158 and 160 is connected through a current limiting output resistor 176 to a transfer station circuit output node 178. This circuit output node 178 is interconnected via a feedback resistor 114 to one input conductor 90 of the operational amplifier 102, and this feedback resistor 114 couples the potential variations at the circuit output node 178 back to the input conductor 90 in the differential amplifier stage 40.

The null indicator stage 44 includes a null meter 180 which is connected between the circuit output node 178 and another circuit terminal 182 as shown. The switches 186 and 204 each have, respectively, a balance terminal 188, 205 and a transfer terminal 190, 200, and a pair of serially connected current limiting field-effect diodes 194 and 196 are connected between the balance terminal 188 and the load terminal 26 to which the composite final control element 23 is connected. These FET diodes 194 and 196 limit the current through the null meter 180 when the null indicator switches 186 and 204 are in their "balance" position.

OPERATION OF THE PREFERRED EMBODIMENT

Suppose now that the transfer station 32 in FIG. 4 is not in use and is not connected to the load terminal 26 between the composite final control element 23 and the output device 28 of the automatic controller 16. Assume also that the automatic controller 16 is in use, connected as shown in FIG. 1 in the process control loop and that it is desired now to remove the automatic controller 16 from the process control loop. Such removal involves disconnecting the previously conducting controller output device 28 from the load terminal 26. During actual removal of the controller 16 from the loop, during the time in which the controller 16 is out of the loop and during its reinsertion in the process control loop, it is desired, in accordance with the present invention, to maintain a substantially constant current through the composite final control element 23. It is also desired that the value of this constant current be the same as that current flowing in controller output device 28 before the controller 16 is removed from the loop. To accomplish this, the switches 186 and 204 are initially switched to their "balance" position, thereby interconnecting the load terminal 26 to the current limiting field-effect diodes 194 and 196. If the voltage at the load terminal 26 with respect to the +45 volt supply at terminal 24 is equal to the voltage at the output circuit node 178 with respect to the +45 volt supply voltage at terminal 24, then the null meter 180 will read zero. This will indicate that the current amplifier 42 is now capable of conducting a current equal in magnitude to the current flowing in the composite final control element 23. Therefore, when the switches 186 and 204 in the null indicator stage 44 are switched to their downward position to thereby connect the load terminal 26 directly to the output circuit node 178, and when the controller 16 is disconnected from the load terminal 26, the current amplifier stage 42 will continue to bypass or sink this same value of current equal to that previously flowing in the output device 28 of the automatic controller 16. In this manner, the controller 16 can be disconnected from the load terminal 26 without "bumping" the closed loop process control system or otherwise interrupting the current flowing in the composite final control element 23. Of course, if the load terminal 26 is connected to the output circuit node 178 without disconnecting the controller 16 fro the circuit, then the constant current sink transistor 28 in the controller 16 will continue to conduct the entire current flowing in the final control element 23 if the null meter 180 reads zero prior to moving switch 204 downward (FIG. 4) to connect node 26 to node 178.

Suppose now, using the same balance switching procedure outlined above, that upon moving the switches 186 and 204 to their "balance" position, the voltage at circuit terminal 182 is at 40 volts while the voltage at the circuit output node 178 is at +30 volts. This means that the null meter 180 will read a 10 volt differential and that the transfer station 32 must produce an additional 10 volts to null the meter 180; and this is accomplished by adjusting the balance control inputs 90 and 92 to the differential amplifier 40. Assume, for example, that the coarse balance intermediate tap 84 is setting at 30 volts and that the total gain of the differential amplifier 40 — current amplifier 42 pair is approximately 3.3. This amount of voltage gain for these two stages 40 and 42 can be established by the proper selection of values for input resistor 86 in the differential amplifier stage 40 and the feedback resistor 114 between the output of stage 42 and one input 90 of stage 40. By adjusting the intermediate tap 84 to lower the DC voltage thereon to 27 volts and produce a 3 volt change on input resistor 86 of the operational amplifier 102, the output of the current amplifier stage 42 at node 178 will see a +9.9 voltage increase. Now, by making a fine balance control adjustment at the variable tap 76 on the voltage divider resistor 74, voltage at the circuit output node 178 can be increased by +10 volts to approximately 40 volts and thereby null the meter 180. With the voltage balance now obtained between the composite final control element 23 and transfer station 32 with respect to the supply potential at supply terminal 24, the transfer station 32 can now be switched to the transfer mode by moving the switches 186 and 204 to their lower position, thereby connecting the circuit output node 178 directly to the load terminal 26 which is intermediate the process controller output device 28 and the composite final control element 23.

The transfer station 32 will "hold" the voltage across the composite final control element 23 to a constant valve, with the voltage at load terminal 26 being referenced to the +45 volt supply voltage at terminal 24. If the voltage at supply terminal 24 should "drift" up to +47 volts for example, and such voltage change could be caused by a given temperature increase, then a fixed percentage of this increase in voltage is seen at the input conductor 90 of the operational amplifier 102. The latter increase in DC voltage is then amplified by the previously described amplifier stages 40 and 42, with the net result that a +2 volt increase is produced at the load terminal 26 and no net change in voltage appears across the composite final control element 23. Since no net change in voltage appears across either the composite final control element 23 or the transfer station 32 and since the currents in these electronic components 23 and 32 were balanced prior to the above drift in the +45 volt DC supply voltage, then the current flowing in the composite final control element 23 and the transfer station remains constant and unchanged.

Suppose now that it is desired to reinsert the controller 16 or to insert some other different controller 16 in the same location in the process control loop as the previously removed controller. For this condition, the first and second complementary output transistors 158 and 160 in the current amplifier stage 42 can operate in either of two different manners. If the controller output device 28 requires more current than the constant current being maintained and flowing in the composite final control element 23, then the first output transistor 158 in the current amplifier stage 42 will act as a current source and supply the additional required controller current to the output device 28. In the preferred embodiment of the invention, the output device 28 is an NPN-transistor. Thus, if the bias conditions in the newly inserted or reinserted controller 16 are such that the output device 28 therein demands 50 milliamperes at the same time that the composite final control element 23 is conducting 10 milliamperes, then the transfer station 32 will supply, by way of the current source PNP-transistor 158, the additional 40 milliamperes required to make the total of 50 milliamperes collector current to output NPN-device 28 of the newly inserted controller.

If, on the other hand, the reinserted or newly inserted controller 16 requires less current than the constant current flowing in the composite final control element 23, then the second output transistor 160 of the current amplifier stage 42 will act as a current sink to thus provide a bypass current path which is connected in parallel with the output device 28. If the voltmeter null indicator 180 is not at null when the newly inserted or reinserted controller 16 is connected in the process control loop, then current is either being supplied by the current source (first) output transistor 158 or it is being bypassed as described by the current sink (second) transistor 160. For this condition, the controller 16 current can e adjusted to equal the current flowing in the composite final control element 23 and when this condition is reached, meter 180 in the transfer station 32 will be nulled to a zero reading. Upon reaching such condition, the transfer station 32 can be removed from the process control loop without causing an interruption in the current flowing in the composite final control element 23 and without "bumping" the process control loop.

The following table lists those component values used in the construction of a transfer station of the type described above which has been actually built and successfully tested and operated in its intended process control environment.

TABLE

| Component | Value or type |
|---|---|
| Resistors | |
| 56 | 2.4 Kilohms |
| 64 | 240 Ohms |
| 66 | 130 Ohms |
| 72 | 15 Kilohms |
| 74 | 1 Kilohm |
| 78 | 4.99 Kilohm |
| 80 | 1.5 Kilohms |
| 82 | 5 Kilohms |
| 86 | 30.1 Kilohms |
| 98 | 200 Ohms |
| 110 | 1 Kilohm |
| 116 | 24 Kilohms |
| 118 | 200 Ohms |
| 126 | 3.9 Kilohms |
| 148 | 1 Kilohm |
| 150 | 1.8 Kilohms |
| 154 | 3.3 Kilohms |
| 155 | 10 Kilohms |
| 156 | 10 Kilohms |
| 162 | 10 Kilohms |
| 164 | 10 Kilohms |
| 168 | 3 Kilohms |
| 172 | 3 Kilohms |
| 176 | 10 Kilohms |
| Capacitors | |
| 104 | 0.001 Microfarads |

| Diodes | |
|---|---|
| 48 | 1N4751 |
| 52 | 1N4148 |
| 54 | 1N751A |
| 58 | 1N4148 |
| 60 | 1N751A |
| 70 | 1N4061 |

| Transistors | |
|---|---|
| 50 | 2N697 |
| 62 | 2N3567 |
| 144 | 2N3567 |
| 146 | 2N3568 |
| 158 | 2N3741 |
| 160 | 2N3738 |
| 166 | 2N5133 |
| 170 | 2N5138 |

| Field-Effect Diodes | |
|---|---|
| 194 | 2N4117 |
| 196 | 2N4117 |

| Operational Amplifiers | |
|---|---|
| 102 | 1/2 MC1437L |
| 120 | 1/2 MC1437L |

However, the above table should not be construed in any manner as limiting the scope of the present invention. Many of the circuit stages of the above described transfer station lend themselves to obvious variations which can be made without departing from the true scope of this invention. For example, the operational amplifiers 102 and 120 and the current amplifier stage 42 lend themselves to many obvious circuit design modifications.

We claim:

1. Electronic process control circuitry comprising:
   a. controller bypass means connected to a voltage supply terminal and having a circuit output node, said controller bypass means establishing a predetermined voltage difference between said circuit output node and said voltage supply terminal which is equal to the voltage difference across a control element of a process control system through which current flow is to be controlled, and
   b. means for connecting said circuit output node to a load terminal of said control element whereby the current flowing through said circuit output node is proportional to the voltage difference between said circuit output node and said voltage supply terminal, said voltage difference being adjustable to equal to the voltage drop across said control element so that the current flowing from said load terminal to said output circuit node can be made equal to the current flowing in said control element prior to the connection of said load terminal to said output circuit node whereby a bumpless transfer of a process controller to and from said load terminal may be achieved.

2. Circuitry defined in claim 1 wherein:
   a. said controller bypass means includes differential amplifier means coupled to said circuit output mode and including first and second input connections, and
   b. voltage balance control means coupled to one of said first and second input connections of said differential amplifier means and to said voltage supply terminal for biasing said differential amplifier means with respect to the potential on said voltage supply terminal, so that the voltage difference between said circuit output node and said voltage supply terminal can be adjusted by said balance control means to a value equal to the voltage developed across said control element.

3. The circuitry defined in claim 2 which further includes current amplifying means connected between said differential amplifier means and said circuit output node for providing a desired predetermined level of current through said circuit output node.

4. The circuitry defined in claim 3 wherein said current amplifying means includes first and second complementary semiconductor devices connected to said circuit output node, said first semiconductor device providing a source of output current when the controller is drawing more current than the current flowing through said control element, and said second semiconductor device providing a current sink for said control element when the controller current is less than the current through said control element.

5. The circuitry defined in claim 4 which further includes voltage regulating circuit means connected between said voltage supply terminal and a point of reference potential and providing a plurality of reference potentials for operating said differential amplifier means and biasing same with respect to the potential on said voltage supply terminal.

6. A process controller bypass subsystem for a closed loop process control servosystem including, in combination:
   a. a process final control element adapted to function as an electrical-to-mechanical transducer and conducting a predetermined current, the level of which is to be controlled during the removal of an automatic controller from said process control servosystem, and
   b. a controller bypass transfer station connected to said final control element and operative to be biased by the voltage developed across said final control element for conducting a predictable current therethrough which is approximately equal to the current flowing through said final control element, whereby said transfer station will provide a substitute current path for said final control element when said controller is electrically disconnected from said final control element, said transfer station preventing any undesirable current interruption through said final control element when said automatic controller is removed from said process control system.

7. The subsystem defined in claim 6 wherein said transfer station includes a differential amplifier coupled to circuit output node and having at least one input connection thereof operatively biased with respect to the voltage developed across said final control element, so that the output current of said differential amplifier varies in accordance with the current flowing through said final control element.

8. The subsystem defined in claim 7 wherein said transfer station further includes voltage balance control means connected between said final control element and said input connection of said differential amplifier for biasing said differential amplifier with respect to the potential on one side of said final control element.

9. The subsystem defined in claim 8 wherein said transfer station further includes:
   a. a complementary connected current amplifier interconnected between the output of said differential amplifier and said circuit output node for providing a desired level of current through said circuit output node to either source current to or sink current from said circuit output node, depending upon the level of controller current when said automatic controller is connected to said final control element,
   b. current regulating means including a first reference voltage device connected between said voltage supply terminal and said differential amplifier for providing a first reference operating voltage for said differential amplifier,
   c. said balance control means including a second reference voltage device connected between said voltage supply terminal and a source of substantially constant current, said second reference voltage device providing a second reference potential, a selected percentage of which is applied to said differential amplifier to thereby enable the conductivity of said differential amplifier to be controlled with respect to the voltage variations across said final control element, d. a reference buffer amplifier connected between another input connection of said differential amplifier and said balance control means to provide some electrical isolation between said differential amplifier and said balance control means and prevent loading of said balance control means by said differential amplifier, e. said balance control means further including a first voltage divider network connected in parallel with said second reference voltage device and further connected to said one input connection of said differential amplifier for providing a coarse balance control potential for said differential amplifier, and f. said balance control means further including a second voltage divider network connected in parallel with said second reference voltage device and further coupled through said reference buffer amplifier to said another connection of said differential amplifier for providing a fine balance control potential for said amplifier.

10. The subsystem defined in claim 9 which further includes:

a. a null meter connected between said final control element and said circuit output node for measuring the voltage difference between a load terminal of said final control element and said transfer station circuit output node, and b. current limiting means connected between said null meter and said final control elements for limiting the current flowing through said null meter when said null meter is in operation.

11. Electronic bypass circuitry for enabling a bumpless transfer of a process controller to and from a load terminal in a process control loop, including, in combination:

a. an output circuit node, b. means for establishing a predetermined voltage level at said output circuit node equal to the voltage level at said load terminal, and c. means for connecting said load terminal to said output circuit node when said voltage levels at said load terminal and said output circuit code are equal, whereby said circuitry can be adjusted to conduct zero current when connected to said load terminal simultaneously with a process controller and further to conduct process controller current when said process controller is disconnected from said load terminal.

12. Circuitry defined in claim 11 wherein:

a. said means for establishing a predetermined voltage level includes differential amplifier means connected to a common voltage supply terminal for itself and a final control element of a process control loop, the output of said differential amplifier means being further coupled to said output circuit node, and b. means for switching a null balance meter between said output circuit node and said load terminal for measuring the difference of potential therebetween, whereby said differential amplifier means may be rapidly adjusted to establish equal potential conditions at both said output circuit node and said load terminal.

* * * * *